US011724824B2

(12) United States Patent
Russell

(10) Patent No.: US 11,724,824 B2
(45) Date of Patent: Aug. 15, 2023

(54) SYSTEMS AND TECHNIQUES FOR LAUNCHING A PAYLOAD

(71) Applicant: EnergeticX.net, L.L.C., Spokane, WA (US)

(72) Inventor: Mark C. Russell, Spokane, WA (US)

(73) Assignee: EnergeticX.net, L.L.C., Spokane, WA (US)

( * ) Notice: Subject to any disclaimer, the term of this patent is extended or adjusted under 35 U.S.C. 154(b) by 760 days.

(21) Appl. No.: 16/012,741

(22) Filed: Jun. 19, 2018

(65) Prior Publication Data

US 2018/0362191 A1     Dec. 20, 2018

Related U.S. Application Data

(60) Provisional application No. 62/522,041, filed on Jun. 19, 2017.

(51) Int. Cl.
| | |
|---|---|
| *B64G 1/00* | (2006.01) |
| *F41F 3/04* | (2006.01) |
| *B64G 1/40* | (2006.01) |
| *F42B 12/66* | (2006.01) |
| *F41A 1/02* | (2006.01) |
| *F41B 11/00* | (2013.01) |
| *F41B 6/00* | (2006.01) |

(52) U.S. Cl.
CPC .............. *B64G 1/002* (2013.01); *B64G 1/409* (2013.01); *F41A 1/02* (2013.01); *F41F 3/04* (2013.01); *F42B 12/66* (2013.01); *F41B 6/00* (2013.01); *F41B 11/00* (2013.01)

(58) Field of Classification Search
CPC ........ B64G 1/002; B64G 1/005; B64G 1/007; B64G 1/64; B64G 1/646; B64G 1/409; F41A 1/02; F41F 3/04; F42B 23/66; F41B 6/00
See application file for complete search history.

(56) References Cited

U.S. PATENT DOCUMENTS

| | | | | |
|---|---|---|---|---|
| 3,011,406 A | * | 12/1961 | Courembis | ............... B64G 1/40 89/1.818 |
| 4,319,168 A | * | 3/1982 | Kemeny | ................. F41B 6/006 104/282 |
| 4,590,842 A | * | 5/1986 | Goldstein | ................. F41A 1/02 376/102 |

(Continued)

OTHER PUBLICATIONS

NASA, Space Station Under Construction: Building a Ship Outside a Shipyard, https://www.nasa.gov/mission_pages/station/main/iss_construction.html, Sep. 9, 2006 (Year: 2006).*

(Continued)

*Primary Examiner* — Benjamin P Lee
(74) *Attorney, Agent, or Firm* — Lee & Hayes, P.C.

(57) ABSTRACT

This disclosure describes various techniques and systems for rapid low-cost access to suborbital and orbital space and accommodation of acceleration of sensitive payloads to space. For example, a distributed gas injection system may be used in a ram accelerator to launch multiple payloads through the atmosphere. Additionally or alternatively, multiple projectiles may assemble during flight through the atmosphere to transfer and/or resources to another projectile.

5 Claims, 14 Drawing Sheets

(56) References Cited

U.S. PATENT DOCUMENTS

| | | | | |
|---|---|---|---|---|
| 4,791,850 A * | 12/1988 | Minovitch | ............... | F41B 6/00 102/489 |
| 4,938,112 A * | 7/1990 | Hertzberg | ................ | F41A 1/02 60/768 |
| 5,016,518 A * | 5/1991 | Kaplan | .................... | F41B 6/00 102/202.5 |
| 5,024,137 A * | 6/1991 | Schroeder | ................ | F41B 6/00 124/3 |
| 5,033,355 A * | 7/1991 | Goldstein | ................ | F41B 6/00 89/8 |
| 5,097,743 A * | 3/1992 | Hertzberg | ................ | F41A 1/02 60/767 |
| 5,233,903 A * | 8/1993 | Saphier | .................... | F41B 6/00 89/7 |
| 5,305,974 A * | 4/1994 | Willis | .................... | F42B 6/006 244/171.5 |
| 7,762,173 B2 * | 7/2010 | Root, Jr. | ................ | F41B 6/003 89/1.819 |
| 7,775,148 B1 * | 8/2010 | McDermott | ........... | F41B 11/62 89/8 |
| 8,056,462 B1 * | 11/2011 | Lacy | ...................... | F41B 11/62 89/8 |
| 9,463,881 B2 * | 10/2016 | Palmer | .................... | F42B 15/12 |
| 10,571,222 B2 * | 2/2020 | Strocchia-Rivera | ...... | F41F 3/07 |
| 10,669,046 B2 * | 6/2020 | Palmer | .................... | B64G 1/002 |
| 2011/0302906 A1 * | 12/2011 | Sinko | .................... | B64G 1/409 60/204 |
| 2012/0187249 A1 * | 7/2012 | Hunter | .................... | F41F 1/00 244/158.5 |
| 2014/0306064 A1 * | 10/2014 | Palmer | .................... | F42C 11/00 244/171.1 |
| 2014/0367523 A1 * | 12/2014 | Kitazawa | ............... | B64G 1/646 244/158.4 |
| 2015/0151856 A1 * | 6/2015 | Reed | .................... | B64G 1/242 244/158.4 |
| 2015/0175278 A1 * | 6/2015 | Hunter | .................... | F41B 11/60 244/158.5 |
| 2016/0297548 A1 * | 10/2016 | Powell | .................... | F41B 6/006 |
| 2018/0251237 A1 * | 9/2018 | Palmer | .................... | B64F 1/04 |
| 2019/0023414 A1 * | 1/2019 | Palmer | .................... | F41A 1/02 |
| 2020/0031500 A1 * | 1/2020 | Russell | .................. | F41F 3/052 |

OTHER PUBLICATIONS

AOE 4065 pdf document: Space Design (Design of a Earth-to-Mars Tether Launch System Dec. 12, 2001 Michael P. Belcher.*

* cited by examiner

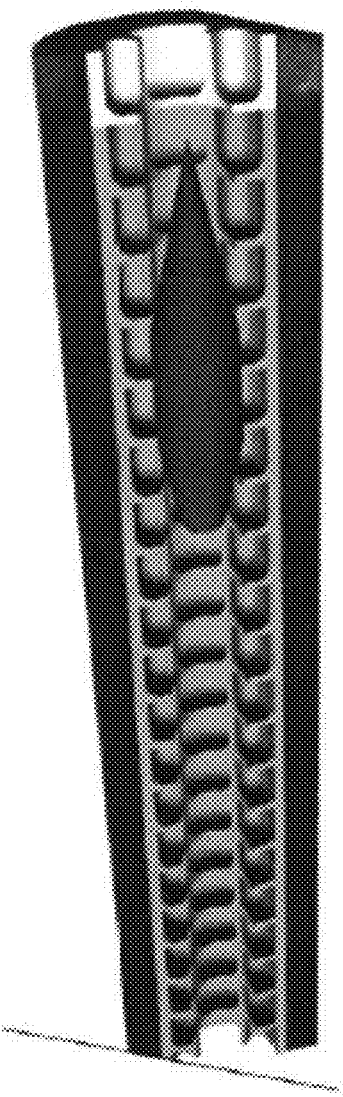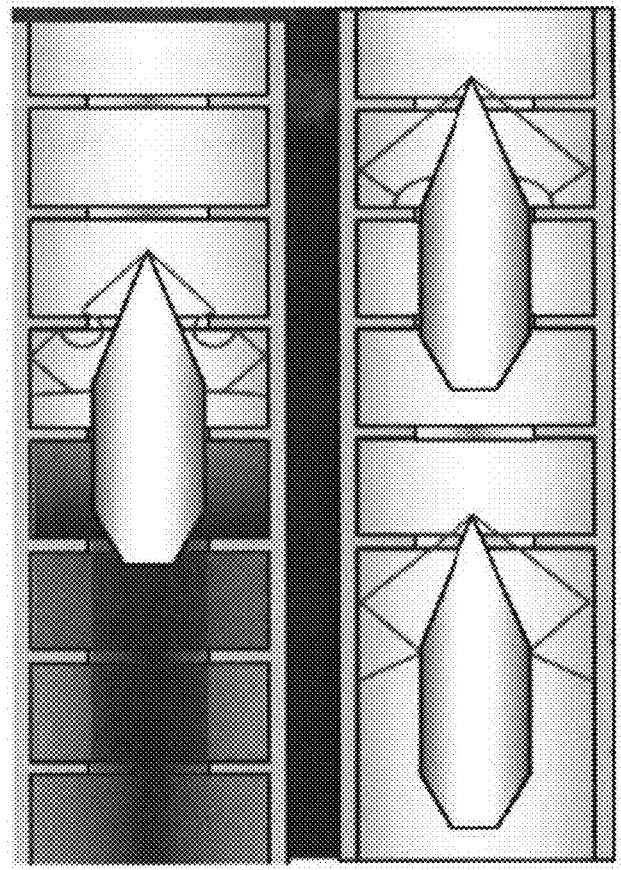
Fig. 8A
Fig. 8B

1300 ↘

```
┌─────────────────────────────────────────────────────┐
│ Load a projectile into a distributed injection cold gas start │
│          gun of a ram accelerator 1302              │
└─────────────────────────────────────────────────────┘
                          ↓
┌─────────────────────────────────────────────────────┐
│ Selectively pressurize the tube of the cold gas start gun to │
│            accelerate the projectile 1304            │
└─────────────────────────────────────────────────────┘
                          ↓
┌─────────────────────────────────────────────────────┐
│  Release a movable diaphragm towards the projectile in │
│           the cold gas start gun 1306                │
└─────────────────────────────────────────────────────┘
                          ↓
┌─────────────────────────────────────────────────────┐
│  Open a fast-acting valve between the cold gas start gun │
│     and a ram section of the ram accelerator 1308    │
└─────────────────────────────────────────────────────┘
                          ↓
┌─────────────────────────────────────────────────────┐
│   Pass the projectile through the fast-acting valve  │
│     maintaining a velocity of the projectile 1310    │
└─────────────────────────────────────────────────────┘
                          ↓
┌─────────────────────────────────────────────────────┐
│  Accelerate the projectile through the ram accelerator │
│            using ram combustion 1312                 │
└─────────────────────────────────────────────────────┘
```

Fig. 13

SYSTEMS AND TECHNIQUES FOR LAUNCHING A PAYLOAD

BACKGROUND

Traditional aerospace launch technologies use multi-stage chemical rockets, typically lifting from the surface (or near-surface) of a planet or moon, starting with nearly zero relative velocity. The rocket equation predicts that a very small payload fraction to space is allowable 1-10% or smaller compared with takeoff gross weight of conventional launch vehicle. While offering modest quasi-static acceleration loads to the payloads (3-10 G's) in very low frequency range and modest to high shock acceleration in high frequency range for pyro events (e.g., spacecraft separation rings and bolts, staging separation, etc.). These traditional rocket loads and dynamics are compatible with existing fragile spacecraft as well as compatible with human spaceflight. The first stages of these conventional rockets depart slowly and perform gravity turns that are very costly from a performance standpoint. The vehicles must carry all of its fuel and oxidizer with it during the entire flight ultimately leaving the payload with the desired energy state (delta v) required for a specific space mission. As such, there is a need to address some or all of these limitations.

SUMMARY

This disclosure describes various techniques and systems for rapid low-cost access to suborbital and orbital space and accommodation of acceleration of sensitive payloads to space. For example, a distributed gas injection system may be used in a ram accelerator to launch multiple payloads through the atmosphere. Additionally or alternatively, multiple projectiles may assemble during flight through the atmosphere to transfer and/or resources to another projectile.

BRIEF DESCRIPTION OF THE DRAWINGS

The Detailed Description is set forth with reference to the accompanying figures. In the figures, the left-most digit(s) of a reference number identifies the figure in which the reference number first appears. The same reference numbers in different figures indicate similar or identical items.

FIGS. 8A-10 illustrative launch system configurations.
FIGS. 13 and 14 show illustrative launching techniques.

DETAILED DESCRIPTION

Overview

Figure 1:
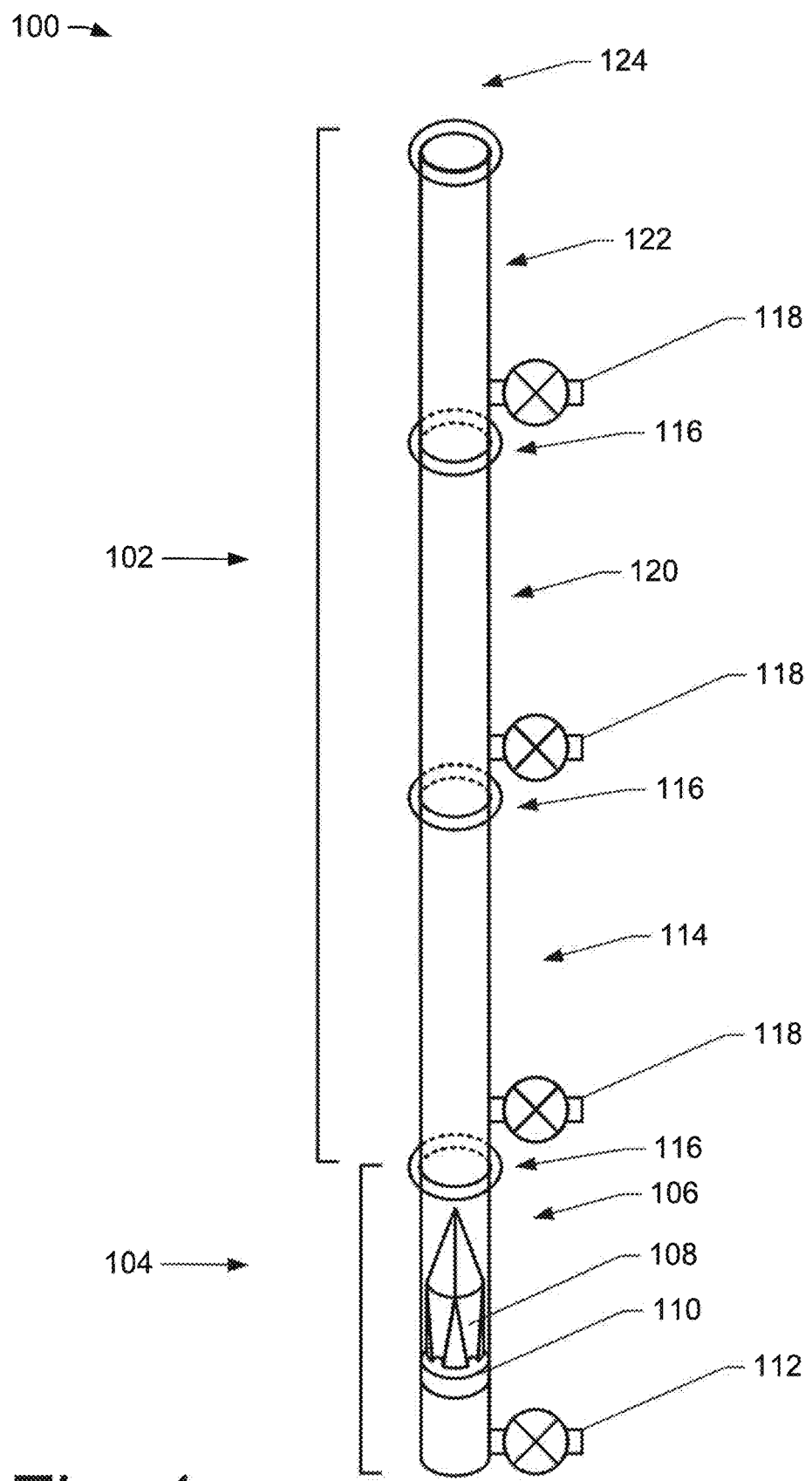
FIG. 1 shows an illustrative ram accelerator.

This disclosure describes various techniques and systems for rapid low-cost access to suborbital and orbital space and accommodation of acceleration of sensitive payloads to space.

An internet connected system allows a user to select a pre-packaged satellite or payload or electronic and upload specific code on demand and launch or place their own payloads on board and market and promote their own space business and launch on demand. Additionally or alternatively, various embodiments contemplate systems and techniques for launching multiple launch vehicles separately and having them assemble in flight. Additionally or alternatively, various embodiments contemplate a relatively low G-load launch system allowing a projectile to accelerate at relatively lower G-loads.

Traditional aerospace launch technologies use multi-stage chemical rockets, typically lifting from the surface (or near-surface) of a planet or moon, starting with nearly zero relative velocity. The rocket equation predicts that a very small payload fraction to space is allowable 1-10% or smaller compared with takeoff gross weight of conventional launch vehicle. While offering modest quasi-static acceleration loads to the payloads (3-10 G's) in very low frequency range and modest to high shock acceleration in high frequency range for pyro events (e.g., spacecraft separation rings and bolts, staging separation, etc.). These traditional rocket loads and dynamics are compatible with existing fragile spacecraft as well as compatible with human spaceflight. The first stages of these conventional rockets depart slowly and perform gravity turns that are very costly from a performance standpoint. The vehicles must carry all of its fuel and oxidizer with it during the entire flight ultimately leaving the payload with the desired energy state (delta v) required for a specific space mission. Typical delta v for orbital flight is approximately 7.5 km/s. These traditional rocket systems are high capital expense systems, high operating expense and limited re-usability for one or more stages for conventional rockets with vertical or horizontal landing systems. Since the days Jules Verne, gun launch spacecraft have been considered as an alternative to traditional spaceflight. Unfortunately, guns do not scale well for larger masses to high velocity, leading to very long barrels (for guns) and limited performance and extremely large acceleration loads on the projectiles and payloads. High acceleration compatible electronics have been shown to survive military and scientific gun launch, however this method is incompatible with acceleration "G" loads that are typical for traditional space payloads as well as human spaceflight.

This application discloses systems and techniques for repetitive low-cost launches to sub-orbital, orbital, and earth escape velocity launches to space while providing a modest acceleration load profile for the payload and projectile in all stages of flight from start up to orbital insertion. These various novel embodiments use one or more acceleration systems, for example, ram accelerator systems with a low acceleration start "gun" (Electromagnet Rail gun, coil gun, or vented or unvented light gas gun and distributed injection cold and hot gas guns) to bring the projectile(s) up to ram or baffle tube ram accelerator start speed.

FIG. 1 shows an illustrative ram accelerator system 100. Ram accelerators and baffle tube ram accelerators are often classified as chemical mass drivers that accelerate a projectile through a tube filled with combustible chemicals setting up a ramjet engine effect using a normal shock on the back base to accelerate the projectiles through the gases. For example, FIG. 1 shows a ram accelerator system 100 with a ram accelerator section 102 and a starting system 104. For example, the starting system 104 may comprise a cold gas gun starter. FIG. 1 also shows a projectile assembly 106. For example, the projectile assembly 106 may comprise a projectile 108 and an obturator 110. FIG. 1 also shows a gas valve 112 disposed at the starting system 104 to introduce a propellant to accelerate the projectile assembly 106. FIG. 1 also shows a first stage 114 of the ram accelerator section 102. Various embodiments contemplate that various stages of the ram accelerator section 102 may be isolated by transitions (e.g., 116) and supplied with propellant gasses through supply mechanisms (e.g., supply valve 118). Various embodiments contemplate that transition 116 may comprise a diaphragm, a valve, an electromagnetic device, or an equalized pressure, among other configurations. FIG. 1 also shows a second stage 120 through which the projectile may pass. Various embodiments contemplate the projectile sustaining a shock wave through the second stage 120 while the second stage 120 is pressurized with a desired media combusting the same to further accelerate the projectile.

Additionally or alternatively the ram accelerator section 102 may further comprise any number of stages. The number of stages is based on a desired launch profile, acceleration profile, jerk profile, among other factors. Additionally or alternatively, FIG. 1 also shows a third stage 122. The third stage 122 may be configured similarly to the second stage 120 to further accelerate the projectile. However, the third stage 122 may also be configured to transition the pressure that the projectile experiences in earlier stages to a pressure more desirable or entering the atmosphere at exit 124. Various embodiments contemplate that this may cause a deceleration in the projectile from the preceding stage, however, by beginning to equalize the pressure with the atmosphere in a controlled manner the projectile may experience less shock at the transition to the atmosphere at exit 124 and overall increase the overall performance and/or desirable flight conditions through the atmosphere.

Additionally or alternatively, various embodiments contemplate that a Ram-jet may operate differently than a gun, in that it allows for a customized pressure and propellant types that vary in discrete "stages" or in a continuum gradient and thus allow a custom-tailored acceleration profile for the projectile assembly. This offers a unique impulse space launch capability that due to variable length and G-loads allows conventional low-G tolerant payloads a direct ride to hypervelocity impulse space launch without the significantly larger G-shock loading of a large gun.

Additionally or alternatively, various embodiments contemplate that a projectile with an obturator or contact through an obturator typically transfers a pressure load from the start gun through the projectile bringing it up to ram acceleration speeds. Various embodiments contemplate a typical speed of 600 m/s for a baffle tube ram accelerator system and 850-1100 m/s for a smooth bore or railed ram accelerator system. After the projectile reaches "ramming" effective speeds, the ram accelerator or baffle tube ram accelerator may have multiple gas stages to tailor the acceleration profile of the projectile assembly to reach the desired exit velocity.

Additionally or alternatively, various embodiments contemplate that the projectile shape along with a number of factors are tailorable to impact the effectiveness of the system. For example, a number of those factors include, but are not limited to, velocity in the tube, variable gas pressure, types, density, and locations of propellants, projectile mass, payload mass, center of gravity (CG), maximum diameter, combustion additives inhibitors, obturators, tube structure, stage separation mechanisms such as, but not limited to slow ball valves, fast ball valves, knife-gate valves, diaphragms, rails, projectile fin interaction among others and combinations thereof.

Figure 2:
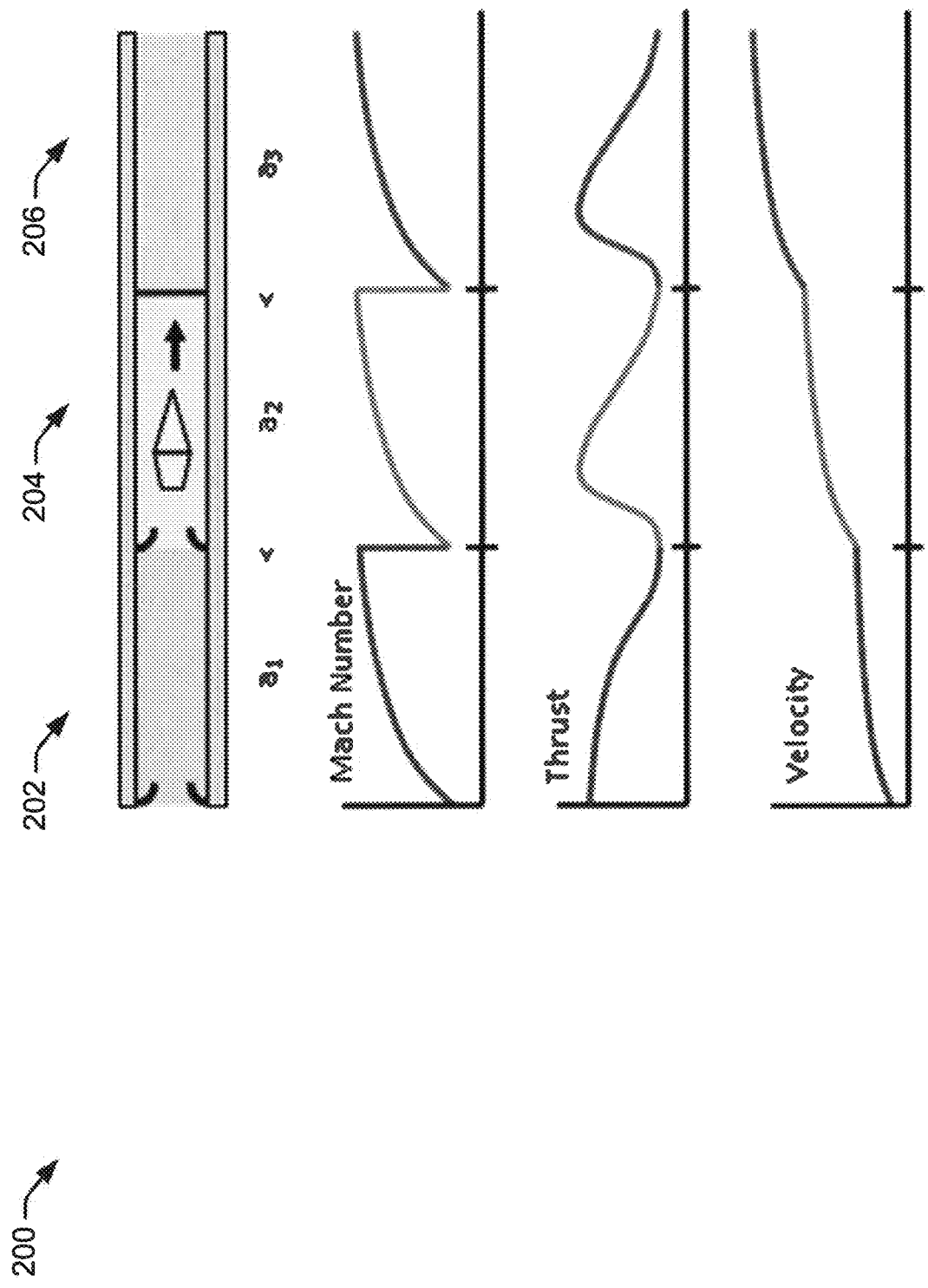
FIG. 2 shows an illustrative ram accelerator acceleration profile.

FIG. 2 shows an illustrative example 200 of tailoring sections of a ram accelerator (102, 104, and 106) with a pressure, medium, transition features among others, to control the Mach number and thrust produced to increase the velocity.

Various embodiments contemplate a start gun configured to enable a low G ram operation. A pressure or an electromagnetic field may to act upon the projectile assembly to accelerate the projectile to ram start velocity. For example, in one embodiment a single stage or 2-stage light gas gun may be used to generate a modest pressure to move a projectile. For example, a 2 kg (4.41 lb) projectile with bore diameter of 100 mm (~4 inches) of the launch tube (and ram accelerator tube) with 6.894 MPa (1000 psia) will experience an acceleration of approximately 27100 m/s^2 which equates to 2740 G's peak. Which, depending on the sound speed of the gas (for example, He, H2, N2, air, among others) used for the gun, will accelerate the projectile up to ramming speeds over a known distance. The lower the G-load allowable, the longer the gun, up to appoint where normal smooth and rail tube bore ram acceleration may not be able to "start" and thus a lower entrance velocity accelerator call the baffle tube ram accelerator may be used. As another example a 1500 kg (2200 lb) projectile assembly with a 1.5 meter inner diameter needs only 275 kPa (40 psi) pressure to move a projectile at 325 m/s^2 (33 G's) initial acceleration. However, an added volume of gas mass at contact pressure may be introduced to offer a constant acceleration and reach a desired start gun velocity to enter ram acceleration.

Additionally or alternatively, various embodiments contemplate that an accelerator for the start gun is not a gas gun, but an electromagnetic mass driver (e.g., a coil or rail gun) pushing an armature, similar to the obturator, to the start speeds of the ram accelerator or the baffle tube ram accelerator.

Additionally or alternatively, various embodiments contemplate a start gun, vented or not vented, may use a distributed gas injection gun. Various embodiments contemplate injecting cold gas as the projectile assembly passes through a series of fast valves or breaking diaphragms that continuously add high pressure mass flow to push the projectile up to ramming speeds or the slow starting baffle tube ramming speeds.

Additionally or alternatively, various embodiments contemplate features of a distributed injection system may include but are not limited to: Tube Diameter, Tube Length, Projectile Mass, Pressure of Supply, Volume of Supply Injection area, Injection area as function of location, speed of sound of gas, density, temperature, type (He, H2, N2, air, etc.), Timing of the injection, Type of Gas, Press in the tube, Friction of the obturator or projectile (seal), among others.

Additionally or alternatively, various embodiments contemplate that since the system may use low cost start gun or re-usable start-gun gas, and a baffle tube ram accelerator, they system is able to use a much lower energy start mechanism, for example, similar to conventional catapult launch system the navy uses or simple gas or low fidelity electric gun solutions for the start gun.

Figure 3:
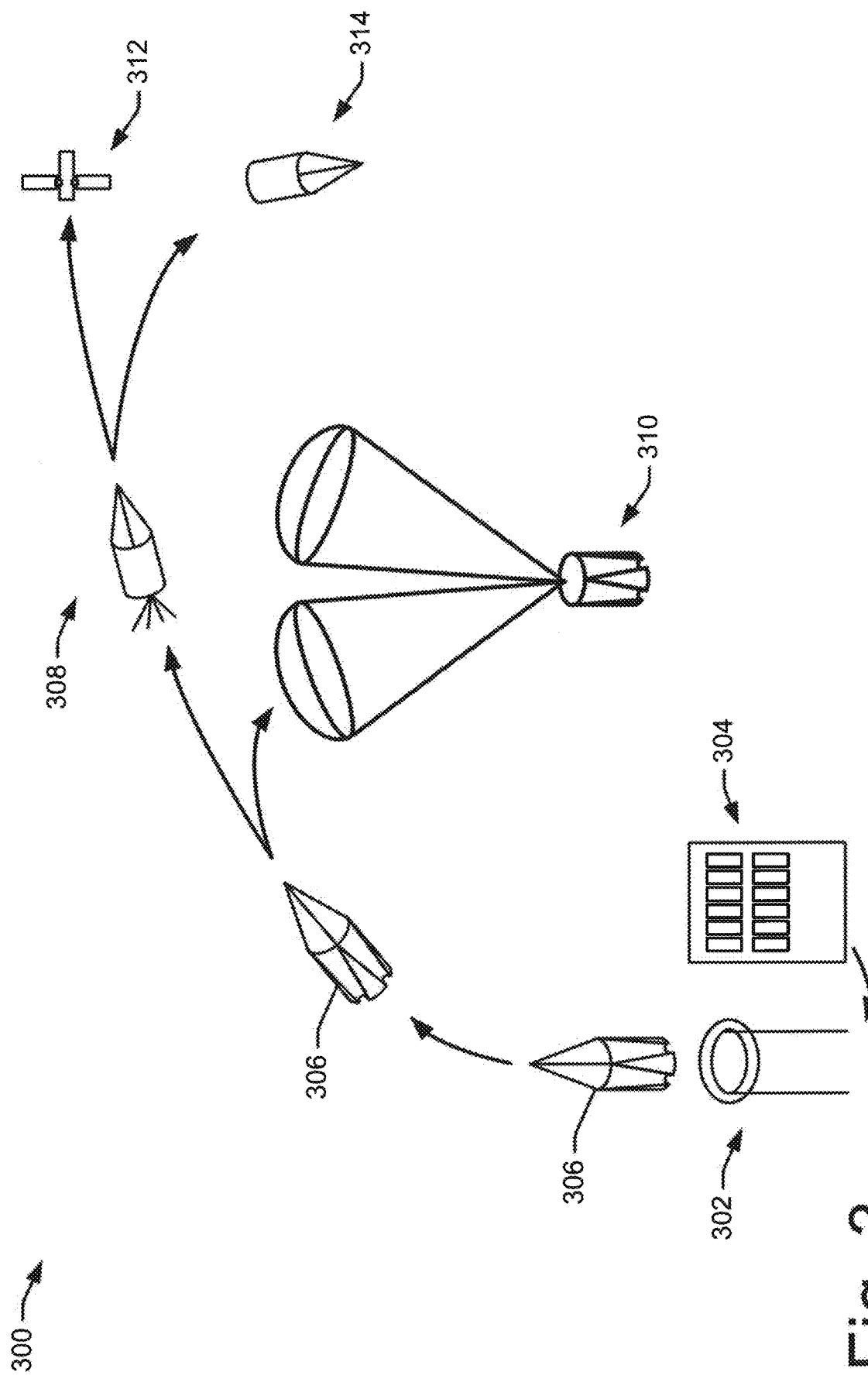
FIGS. 3-5 show illustrative launch configurations.

FIG. 3 shows an illustrative example of a tailorable ram accelerator system 300. For example, for a given projectile mass the pressure on the ram accelerator projectile is provided by the ram accelerator system (e.g., based at least in part on projectile at speed, velocity, ram tube size and configuration, and combustion gases).

Additionally or alternatively, various embodiments contemplate that the system is able to bound the acceleration in each stage by Projectile Mass, combustion gases, and fill pressure. For example, a projectile of 1500 kg in a 1500 mm dimeter Ram tube section, a Pressure multiplication of fill of about 20× fill pressure is expected. For a 2 psia (13800 Pa) fill pressure, the system expects to see a low Acceleration of 33 G's. Each stage may be tailored to maintain a near contact acceleration and the superposition of all of these stages and the acceleration may be a nearly constant acceleration profile.

Additionally or alternatively, various embodiments contemplate an acceleration system in a vertical or inclined orientation for the projectile to exit the system, for example, to be directed to space. However, the orientation may be in any direction. For example, various embodiments contemplate additional orientations. For example, various embodiments contemplate orientating the projectile exit path to be substantially horizontal or substantially parallel to a direction of movement of an aircraft or surface based vehicle. For example, an embodiment of a launch system may be mounted to or installed in an aircraft, for example, a commercial, military, private, or research, in flight. Additionally or alternatively, various embodiments contemplate orientating the projectile path in any direction for impact uses, for example, tunneling or drilling. Additionally, the orientation may be downwards, for example, for drilling or shaft making.

Additionally or alternatively, various embodiments contemplate a G-matched distributed injection gas gun coupled into a nearly constant G ram accelerator system providing a tailored G load for the acceleration portion of flight. Additionally or alternatively, various embodiments contemplate integrating a distributed injection gas gun with a movable diaphragm for example, a cup shaped device, configured to increase the relative velocity of the projectile in a medium, for example the gas of the gas gun. Additionally or alternatively, the distributed injection gas gun may comprise the use of valves, highspeed valves, baffles, or combinations thereof of to selectively inject gas into start gun.

Additionally or alternatively, various embodiments contemplate managing G loads for the jerk (rate of change of acceleration/deceleration) and acceleration (deceleration) between stages and at or near the exit. For example, use of slow valves as stage separation, allows for constant pressure fill between the stages. For example, just prior to starting the start gun, the stages are brought into equal pressure with a pressure measurement and tailoring system during fill or with purge of each stage of gas to have nearly exact gauge pressure between stages. The valves, when open, allow only diffusion or else a prescribed about of mixing between the stages, creating a transition zone for the projectile to softly pass through rather than having a sharp acceleration change at each stage transition. Additionally or alternatively, various embodiments contemplate that each stage of the ram may be monitored for pressure and small differential pressure device (regulator) may manage the valves.

Additionally or alternatively, various embodiments contemplate that a Fast Valve operation may allow the system to fill each stage at different pressure and just prior to the arrival of the projectile to the stage a diaphragm is broken or a high speed valve is actuated to allow the incoming projectile to maintain a nearly constant acceleration between stages as the different pressures of the adjoining stages may be a necessary variable to maintain constant and/or consistent acceleration of the projectile.

Additionally or alternatively, various embodiments contemplate using electromagnetics (e.g., coilgun, rail gun, etc.) to transfer loads from a coil (for instance) wrapped around a portion of the Ram tube (non-ferrous or ferrous) to the projectile where that magnetic field interacts with a ferrous or other magnet field within the projectile assembly (e.g., obturator, armature, body, projectile, etc.). With this mechanism, the system is able to manage a transition between stages where there is a discontinuity in between the stages and the electromagnetic field can be used just ahead of the arrival of the projectile to synch up and match the acceleration profile and maintain over a short distance the constant acceleration as the projectile transitions into the next stage of the accelerator.

At the tube exit into the atmosphere there will be a relatively high-drag portion of the flight. To reduce this effect, various embodiments contemplate that the system may use variable gas dynamics to transition from a ram acceleration mode and transition into coast mode with modest deceleration, while maintaining an acceptable exit velocity. For example, near the exit of the ram accelerator, the system can use variable sound speed gases and thinner combustion mixtures to transition to a low to no acceleration from the modest G load acceleration. Heating air in the tube as well as evacuation section of a drift tube and heating the atmosphere ahead of the projectile are all methods the varying the acceleration of the projectile to have a soft transition into the higher drag portion of flight cause by the atmosphere.

Additionally or alternatively, various embodiments contemplate that releasing the projectile at the top of a high-altitude mountain or from an aircraft in lower density air or off into a planet or a moon with little to no atmosphere are ways to reduce the atmospheric drag that would otherwise decelerate the payload.

Additionally or alternatively, various embodiments contemplate that the discussed techniques and systems not only tailor the G-load (acceleration and deceleration) but also tailor the rate of change of the deceleration/acceleration: the jerk. For some payloads, including human astronauts and pilots/passengers, may be a primary loading problem that may result in damage. Managing the Jerk as well as the acceleration is critical to successful payload acceleration management.

For example, a 2 kg, 75 mm frontal diameter projectile launched from a 100 mm tube released into the atmosphere sees a constant deceleration of about 139 G's during atmospheric coast transit. However, a 1500 kg, 1125 mm projectile frontal diameter from a 1500 mm tube see about 42 G's of deceleration. These acceleration loads in the transition zones and the exit are important to manage and various embodiments of the system can afford a tailored acceleration profile from end to end to ensure the payload is not exposed to detrimental forces, pressures, acceleration and jerks during the impulse launch and coast sequence.

Illustrative User Experience

The following is a description of illustrative user experiences and paths of the projectile throughout several embodiments of the system.

For example, various embodiments contemplate a user (human or automated/robotic user) is able to select and order a Payload Module from a remote location, for example, a website, through an application, through an online store or directly pay at a kiosk or vending machine. The user may use their hand held mobile device, laptop or internet enable computing device or telephone or in-person.

Additionally or alternatively, various embodiments contemplate that at receipt of payment, the fulfillment system will manufacture (e.g., 3D print, or conventional metallic and/or composite manufacturing methods) to order a custom payload module or dispense a pre-made payload module. In one embodiment, the payload module consists of a metallic or composite tube, optionally threaded on one or both ends. A lower end cap provided a bottom to the payload module with a diameter and a surface the interfaces to an aero stabilizing system and transfer loads during the launch and ram acceleration sequence underground to accelerate both the projectile assembly with payload module and the aeroshell.

Additionally or alternatively, various embodiments contemplate that the payload module is marked with Serial # or RFID, etc. Additionally or alternatively, various embodiments contemplate that the vending machine, kiosk, etc. provides atmospheric conditioning to the payload system.

Additionally or alternatively, various embodiments contemplate a user may enter a Punch Code into Vending Machine which will dispense Payload Module. Additionally or alternatively, the user may order it online. The user may place a desired product or products into the payload module. The user may send the Module back to system, where the system may assemble the projectile assembly with the payload module. For example, the payload may be coupled to a nose cone as well as an aeroshell. Additionally or alternatively, various embodiments contemplate that the assembled projectile assembly is loaded into the machine.

Additionally or alternatively, various embodiments contemplate that the projectile and the payload module are separate and are displayed in separate locations (in the vending machine) or in separate machines. The Projectile assembly and the payload module may come together and self-assemble automatically at the surface or underground. This allows the user to always see and interact, for example, via online, with the payload or physically with the payload in the payload processing unit. The vending machine may be a big as shipping container or a building depending on number of payloads, projectile assemblies and sizes (diameter, length, mass). Various embodiments of the system allows the user to show off, market, test, check and generally interact and communicate upload software, etc. before final joining with the projectile assembly.

Additionally or alternatively, various embodiments contemplate a remote launch capability within a window, rather than a specific count down. Additionally or alternatively, the system may provide a remote launch safety key encrypted via the internet. Additionally or alternatively, various embodiments contemplate a remote filling of the ram accelerator system.

Various embodiments contemplate that the system may use a cold gas gun or a light gas gun filling in one or more breaches that operate at modest pressure offer low G load launch for start gun and enter projectile assembly into the ram accelerator, which may be configured as a smooth bore, baffle tube, railed, among others, or combinations thereof.

FIG. 3 shows an illustrative embodiment of a launch environment 300. For example FIG. 3 shows an illustrative launch system 302 coupled to a distribution device 304 configured to select and load a projectile 306 into the launch system 302. After the system launches the projectile 306, the projectile 306 may travel on a ballistic trajectory. Various embodiments contemplate a second stage 308, for example an ATV, continuing to fly while the first stage portion 310 of the projectile 306 may be detached from the second stage 308. Various embodiments contemplate recovering the first stage portion 310 after detachment. Additionally or alternatively, the second stage 308 may deploy a propulsion system to further boost its flight. For example, the second stage 308 may perform an orbital insertion burn. Additionally or alternatively, various embodiments contemplate the second stage 308 deploying a cargo 312, for example, a satellite. Additionally or alternatively, portions of the second stage 308 may stay in orbit or may deorbit, for example, as portions 314. Various embodiments contemplate that depending on the mission profile and construction and composition, portions 314 may burn up in the atmosphere or be recovered on the ground. Additionally or alternatively, portions 314 may have control and propulsion systems to actively guide and control a landing, a deorbit, or similar maneuvers.

Additionally or alternatively, various embodiments contemplate an electro-magnetic release of the locking cup or shearing of locking ring and O-ring. For example, the projectile may have an O-ring as well as a shear spring lip for single ended operation of a projectile. An illustrative example includes a 100 mm diameter projectile. This projectile may be machined from a single rod of grey PVC. This lock ring may be split into 3 parts. A secondary lip may be included and may be used as an intended shear mechanism. Additionally, an obturator with an O-ring 0.92 inches from the back of the obturator may be used. The O-ring may comprise various materials, for example, a 2-239 buna O-ring. The O-ring groove may be 0.187 inches wide and 0.101 inches deep. The lock ring may be machined from 4" schedule 80 grey PVC pipe with thickness of 0.15 inches. The width may be 0.373 inches. Additionally, a spacer material, for example, weather stripping, may be cut into 0.18 inches thick pieces and may be installed approximately every 20 degrees around the circumference of the lock ring. The lock ring groove may be 0.385 inches wide and 0.225 inches deep. The shear lip may be positioned behind the lock ring, and may be 0.35 inches thick.

This configuration is an illustrative example of how the system allows operation in variable pressure G-loading rather than high pressure or detonation. For example, the O-ring may maintain the pressure of the break to push projectile assembly. Additionally, the pressure may also overcome the shear ring. Here, the O-ring could be used in a case where the section is variable and the O-ring holds in shear and pressure as well. For example, the section may form a horn-like shape.

Additionally or alternatively, various embodiments contemplate G-load (acceleration) conditioning of the payload and the projectile assembly during the entire launch sequence and low G (low Jerk, modest acceleration handling) during all stage transitions including entering the atmosphere and introducing the system to atmospheric drag.

Additionally or alternatively, various embodiments contemplate a separation sequence of the payload assembly system allowing an atmospheric transit vehicle (ATV) to emerge. For example, the payload assembly system may include the payload, obturator, aeroshell, and in some embodiments stages, where the obturator, and, in some embodiments, stages, fall away and the payload coupled to an aerodynamic stabilization component may emerge. For example, the aerodynamic stabilization component may comprise a telescoping feature adapted to fins which may resemble a ballistic dart.

Additionally or alternatively, various embodiments contemplate a damping mechanism in the separating projectile assembly to ease transition of payload into stable atmospheric flight. For example, aerodynamic stabilization component may comprise a telescoping, extensible aero structure, which may include a rope or cord or tube among others, or combinations thereof. Additionally or alternatively, an aero structure could be coupled to the end of the extensible component distal from the end coupled to the payload. The aero structure may comprise fins for stability or drogue chute or ballute or an inflating beam for stabilization, among others, or combinations thereof. Additionally or alternatively, various embodiments contemplate using control rockets to control the atmospheric transit vehicle as augmentative control or for total control. Additionally or alternatively, various embodiments contemplate imparting a rotation (e.g., ballistic spinning) to be used for stability.

Additionally or alternatively, various embodiments contemplate that the payload and any propulsion system and aerodynamics continues to altitude and inserts into orbit with an insertion burn or return to earth via ballistic trajectory.

Additionally or alternatively, various embodiments contemplate the payload is encapsulated in a supportive structure, for example, an egg-crate structure, for load transfer and ease of acceleration and jerk and transmission and distribution of those loads. Additionally or alternatively, various embodiments contemplate a variable density liquid ballast may be integrated into the ATV to provide support to the internal structures and components as well as provide ballast to improve atmospheric transition characteristics. This liquid ballast may, in some embodiments, used for thermal sinking and or a source of liquid spray cooling directed via pumping mechanism (mechanical, gravity, thermal, pressure, etc) to cool high heat section of the atmospheric transit vehicle (e.g., a nose cone spray cooling). The ballast fluid (or solid melted paraffin) at pressure may also be used as TVC (Thrust Vector Control) as liquid control jets using mass flow and pressure injection through, for example the side wall locations of the ATV providing lateral and axial control of the vehicle in the Ram accelerator tube, in the atmospheric transit as well as potential in-space (high altitude). For example, an ATV carrying solid propulsion or liquid rocket tanks effectively would have experience lower loads via buoyancy in the variable density liquid ballast. For example, the density of the liquid ballast may be selected to provide a neutral buoyancy, a negative buoyancy, or a positive buoyancy to the internal structure as desired. Additionally or alternatively, the support provided by the liquid ballast or the egg-crate structure to the internal components may enable a more efficient design of the internal components. For example, a liquid fuel tank may have a wall thickness sized for a pressure of the tank. However, the thickness of the tank may need to be increased withstand the additional loads and stresses caused during the launch process. This may add significant weight to the payload to be delivered, for example, to orbit. However, by using the liquid ballast and/or an egg-crate structure to support the tank through the launch process, the increase to the tank wall thickness may be reduced, minimized, or negated altogether.

Additionally or alternatively, various embodiments contemplate that at a point of atmospheric transit completion, a separation mechanism may be activated to sever some or all of the aeroshell segment(s) to allow for an encapsulated vehicle. The separation mechanism may be shear, tensile, compression failure, or combinations or sequences thereof. The split the ATV shell and structure may form the encapsulated payload or orbital vehicle stages. The separation mechanism may be a linear shaped charge using pyrotechnics or could be a high pressure deforming inflatable bladder or tube with a shearing wedge that upon inflation (high pressure shock or slow high pressure) will deform. For example, while deforming, a sharp wedge is translated to shear the aeroshell material (such as wound fiberglass or carbon fiber).

Illustrative Embodiments

Various embodiments contemplate a robust, reusable, Nano and Micro satellite transit vehicle known as the Atmospheric Transfer Vehicle (ATV). However, these techniques and systems are scalable to craft and payloads much larger than nano and micro satellites. For example, craft capable of carrying humans as well as larger exploratory or industrial payloads is also contemplated. Various embodiments contemplate integrating structural components capable of withstanding an impulsive launch from a ram accelerator based launch architectures and in-ground launch sites, for example, those based at Spaceport America, near Las Cruces N. Mex. This cost-effective launch vehicle enables cheap access to space, while providing on-demand launches. Along with minor G-load toughening of existing cubesat payloads, a new class of tough, low-cost payloads will emerge to be able to be flown on this system. The reduction of cost and the ability to have on demand launch services will further strengthen and accelerate the developing small sat market.

Some of the beneficial innovations in this technology which allow the impulsive launch include, but are not limited to that the system may include heat resistant aeroshell to help protect payload and upper stages; the system may provide extendable features to allow for stable flight throughout launch; "Egg carton" technology may help distribute the acceleration load throughout the structure; the system also includes an optimized propulsion system; the stages that do not reach orbit may be recovered for later reuse or disposal; the equipment may be retrieved afterwards by a recovery system that slows the payload and projectile assembly systems to G-loads that allow recovery and recycling or re-use for next flights; the payload assembly information may be broadcast to the payload virtual app store for marketing and information dissemination; the payload may be sent back to the user and original nose cap return onto the payload cylindrical section; and the system may be ready for re-use.

Traditional aerospace launch technologies use multi-stage rockets. Lifting from surface of a planet or moon, starting with zero relative velocity. The Rocket Equation predicts that a very small payload fraction to space is allowable, for example, 10% or smaller. High Capital and limited re-usability of one or more stages for conventional rockets with vertical or horizontal landed systems.

Here, however, various embodiments contemplate use of an automated payload processing facility (e.g., vending machine) and integration of an automated mating above or below ground with the atmospheric transit vehicle (ATV) that is compatible with the Ram accelerator body shape. The ATV may include a sharp nose.

Additionally or alternatively, various embodiments contemplate an internet of things connection. For example, a user may select a payload from the available options.

Additionally or alternatively, various embodiments contemplate end to end management of the G-loads of the vehicle. For example, the main launch G-loads as well as the active control of vibration of the system as it transitions from start gas gun interface to launch tube to first, 2nd third stage, etc. ram accelerator as well as the exit.

Additionally or alternatively, various embodiments contemplate conditioning the exit of the accelerator. For example, gas atmospheric conditioning, thermal, etc. on the exit of the projectile into the atmosphere may be used to avoid, or reduce, rate of change of acceleration (jerk) as well as the acceleration conditioning itself. Characteristics of firing may be adjusted to tailor the profile for the exit, for example, to match the outside atmospheric conditions.

Additionally or alternatively, various embodiments contemplate a laser from the ground (mirrored, etc,) or on board or on the tube to condition the air ahead of the projectile as it flies through the atmosphere. This technique may create an artificial thermal/gas induced shape ahead of the projectile. This may create cavitation zone where the drag of the overall system is substantially reduced do to the modest amount of energy addition and shaping of the drag.

Additionally or alternatively, various embodiments contemplate that, near the exit of the projectile, the system may heat and push hot air, for example, from a jet from within the tube or just our side the tube above or below ground for the exit. This may locally lower the density of the air as well as changing the sound speed of the gas in the exit portion of the flight to reduce drag, thermal as well as shock, jerk and vibration. Preferably, the system may launch from as high of an elevation as practicable (e.g., a tall mountain, an aircraft, etc.) and have a relatively low-density atmosphere to enter (e.g., treated or manipulated as discussed above). The system may operate from a waterborne platform, for example, in the ocean at sea level, or on a lake at sea level or at a higher altitude. Water borne application may allow for ease of pointing (delta V in direction of launch) and distributed injection integration.

Additionally or alternatively, a soft ride gas spring or electromagnetic launcher, coil gun, may be used to handle and even out the G-loads to space.

Additionally or alternatively, various embodiments contemplate that the pusher plate (or obturator) used for Ram accelerator "starting" may act as a shock wave mirror.

Additionally or alternatively, various embodiments contemplate that a laser communications system may be used to facilitate operations. For example, laser communications have high bandwidth. The system may use the laser communication technique to offer a service to communicate at a high bandwidth between a user or the system and the payloads. Various embodiments contemplate that the system owner may own the connection link to the systems from end to end offering the payload customers an opportunity to use multiple approaches. For example, the user may buy a payload with all the pre-set features of a small satellite that the user would like, for example, camera(s), processor, IR sensors, release mechanism, payload bay. Additionally or alternatively, the user may select pre-made petri dishes or other media that host life-science and material science applications on-demand.

Illustrative Launch Systems and Techniques

Various embodiments contemplate a multi-barrel launch system. For example, a total system cost and payload density ratio compared with Gas may dictate that heavier payloads for a given area (Ram area) and propellant mass fraction may be required to have a softer launch (e.g., lower G-loads). For example, various embodiments contemplate a nominal Ram accelerator operating with a fill pressure in the 250 psi to 3000 psi range. Additionally or alternatively, various embodiments contemplate the nominal operation pressure set up by the normal shock (e.g., ring pressure wave) on the aft portion of the ram accelerator projectile when in a thermally choked regime and climbing towards the center body and nose that pushed the projectile.

Additionally or alternatively, various embodiments contemplate self-assembling atmospheric transit vehicles. For example, one or more ATVs may be launched from multiple barrels of a multi-barrel launch system and joint together in flight. For example, after exiting the barrel or tube, one or more ATVs may be controlled to approach each other or the one or more ATVs may be launched with a predetermined intersecting flight path. When sufficiently close to one another, the multiple ATVs may joint together. For example, various embodiments contemplate using one or more of magnetic connections, locking connections, ropes, cables, telescoping connections, nets, among others, or combinations thereof. Additionally or alternatively, various embodiments contemplate that when connected to each other, the ATVs may further connect systems of each ATV. For example, two or more ATV may connect propellant lines. For example, a first ATV may be launch with an oxidizer, a second ATV may be launched with a fuel, and a third ATV may be launched with an engine. When connected, the first and second ATVs may connect with the third ATV through any of the aforementioned techniques. After connection, the ATVs may then connect propellant lines, for example, such that the fuel and oxidizer from first two ATVs may be fed into the engine of the third ATV to provide thrust.

Figure 4:
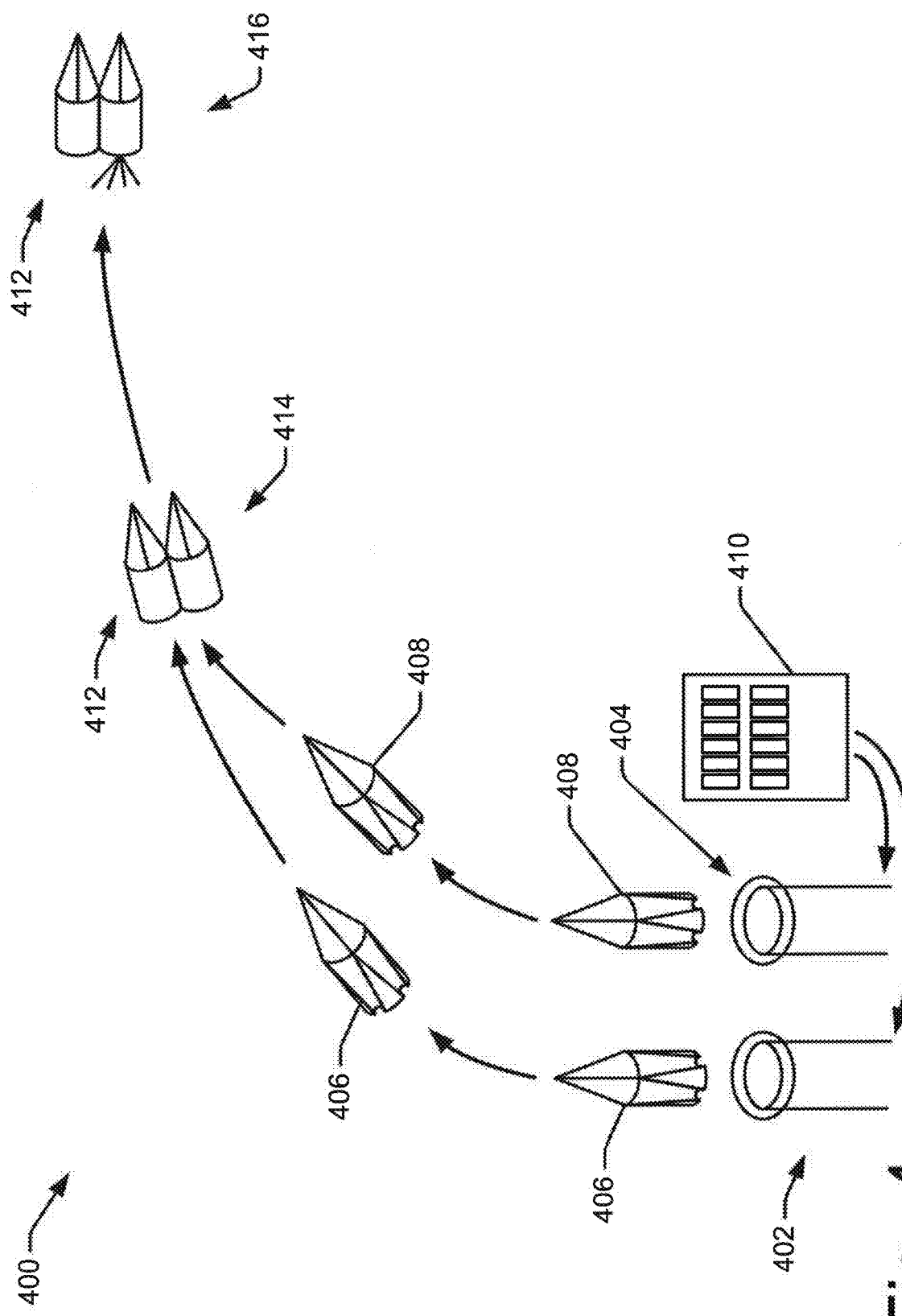

FIG. 4 shows an illustrative launch system where multiple launching mechanisms are used to launch multiple projectiles. For example, FIG. 4 shows launch environment 400 with a first launch mechanism 402 and a second launch mechanism 404. Various embodiments contemplate that a first projectile 406 and a second projectile 408 may be supplied by a distribution system 410. Additionally or alternatively, various embodiments contemplate at least portions of the first and second projectiles 406 and 408 connect in flight to form multiunit ATV 412, for example, at 414. FIG. 4 also shows a portion of multiunit ATV 412 transferring a resource from a portion of the first projectile to a portion of the second projectile, vice versa, or a combination thereof. For example, the portion of the first projectile may transfer a propellant to the portion of the second projectile. Additionally or alternatively, the portion of the second projectile may transfer an energy (e.g., kinetic energy though, for example, thrust) to the portion of the first projectile.

Additionally or alternatively, various embodiments contemplate a space tug configuration. For example, a space tug may grab a hypersonic wire or line, with a damper and a clamp. For example, the space tug may grab on to the ATV from a 1-stage, a 1st stage, or 2nd stage of a launch system. The selection of the number of stages and which stage to connect with may be determined based at least in part on the optimal velocity of the relevant components.

Additionally or alternatively, various embodiments contemplate that a launch tube or series of launch tubes or systems may be bored using hyper tunnel boring technology and may accommodate a low total cost and speed of launch vehicle system design.

Additionally or alternatively, various embodiments contemplate allowing the system to safely launch the people, the fuel and the oxidizer at effectively different times and under different G load conditions that are desirable or optimal for each system. For example, the projectile(s) carrying the fuel and or oxidizer could be heavier or launch at higher G and/or different (e.g., shorter length) tubes when compared to the crew vehicle, so that the vehicles (crew and fuel and oxidizer) can mate up at the point the overall system has linked up. Additionally or alternatively, various embodiments contemplate autochecking the systems in a short time to allow rapid deployment where the crew capsule may be locked and ready for launch when the rest of the system is prepared for deployment.

Additionally or alternatively, various embodiments contemplate that to launch a low G tolerant payload, the system may capture the drogue left by one or more ATVs that have launch in different tubes just ahead (and likely higher G load) of the main capsule which can fly at velocity comparable to the ATV. Then the ATV with low G tolerant payload is connected, for example, like connecting a refueling aircraft, to the higher G ATV, and coasts and then is tugged via normal rocket propulsion of that higher G ATV, for example, a propulsive stage 2 or by a conventional supersonic (subsonic combustion) air breathing ram acceleration.

Additionally or alternatively, various embodiments contemplate the use of a space tether energy generating capability of a space tether to bring energy to a lower ATV after one or more Delta V burns.

Additionally or alternatively, various embodiments contemplate transferring energy to another ATV, for example, by beaming electricity from an ATV to boost lower earth vehicle into higher orbit. Additionally or alternatively, various embodiments contemplate an array of vehicles that beam energy back to an ATV running an electric or hybrid propulsion system which can use the energy beamed to it.

Additionally or alternatively, various embodiments contemplate encapsulation of a person or other G-sensitive payload. Here, the G-loads may be managed using the systems and techniques discussed. For example, they system may encapsulate the disk aircraft as a capsule. The capsule can be smaller like the Manned Orbital Operations Safety Equipment (MOOSE) developed with the astronaut in the back of the projectile.

Additionally or alternatively, various embodiments contemplate using magnetic connection or physical connection to allow one of more objects connected to an accelerating payload. For example, towing an ATV via ram acceleration. For example, reeling out a wire during launch, as for example, demonstrated by a wire guided TOW missile. Additionally or alternatively, various embodiments contemplate allowing the projectile and obturator (if needed) to connect with a wire or high strength cable, embedded or coiled allowing it to pull something along. The cable may also be folded in such away to allow it to connect outside the tube to the article intended for pulling. That article would have to have a heck of a good damper to deal with G shock loads.

Figure 5:
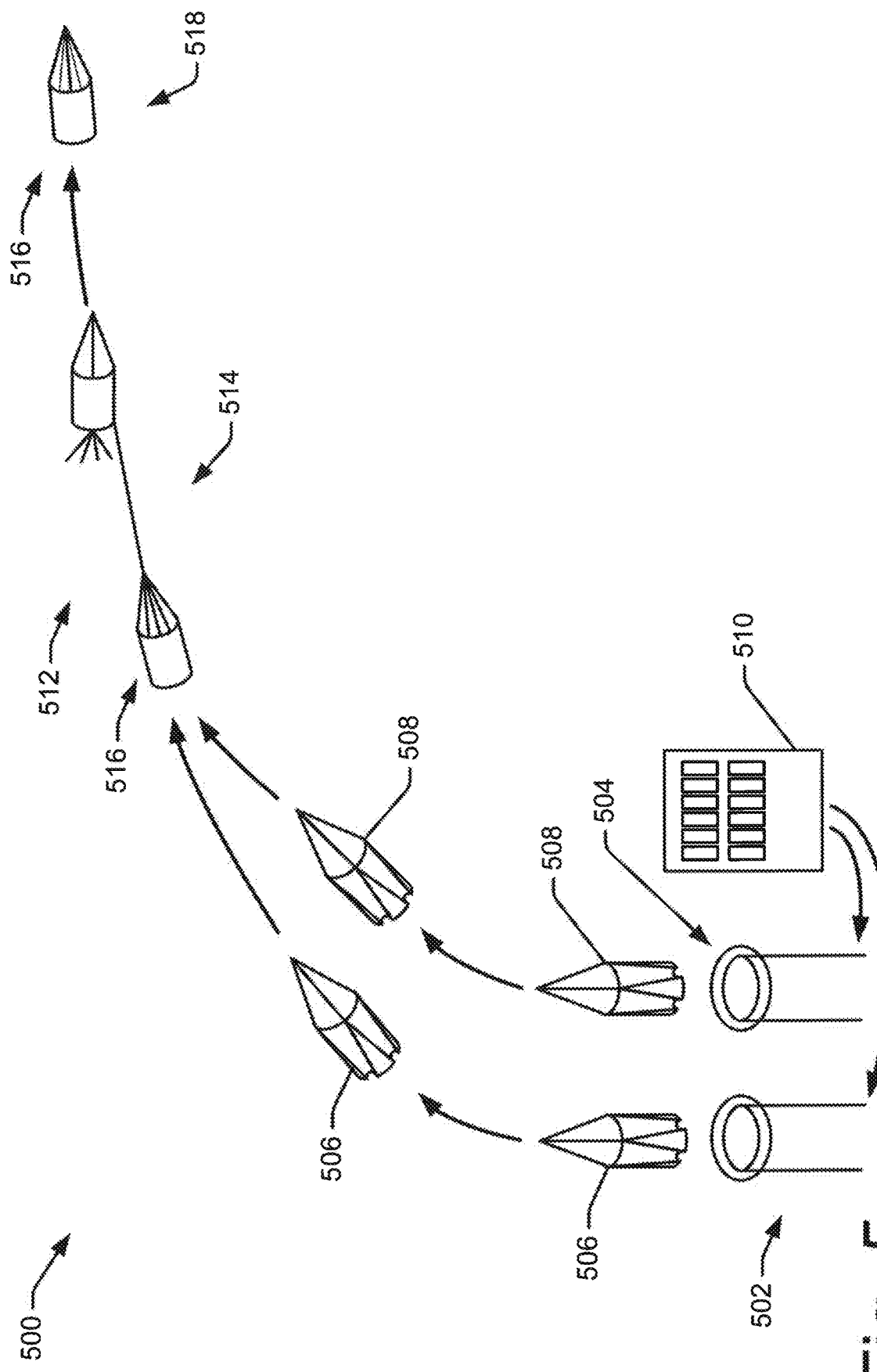

FIG. 5 shows an illustrative launch system where multiple launching mechanisms are used to launch multiple projectiles. For example, FIG. 5 shows launch environment 500 with a first launch mechanism 502 and a second launch mechanism 504. Various embodiments contemplate that a first projectile 506 and a second projectile 508 may be supplied by a distribution system 510. Additionally or alternatively, various embodiments contemplate at least portions of the first and second projectiles 506 and 508 connect in flight to form multiunit ATV 512, for example, at 514. FIG. 5 also shows a portion of multiunit ATV 512 transferring a resource from a portion of the first projectile to a portion of the second projectile. For example, the portion of the first projectile may transfer a kinetic energy boost to the portion of the second projectile, for example through a tether. Additionally or alternatively, after the portion of the first projectile has completed its transfer, it may separate from the portion of the second projectile and the portion of the second projectile 516 may continue, for example, complete orbit insertion, for example, at 518.

Additionally or alternatively, various embodiments contemplate that the pusher (e.g., obturator) may be magnetically propelled, or gas propelled. For example, the interface to the projectile may look like 2 obturators with a spring and damped between them. For example, during the initial start up transients and cold or hot gas pressuring push (or magnetics) this pusher plate spring damper may offer the right dynamic condition for G-sensitive payloads.

Additionally or alternatively, various embodiments contemplate the use of a magnet coupling with the ram accelerator projectile or obturator. For example, a non-metallic launch tube and ram accelerator pipe. The non ferrous materials would allow a magnetic field to pass between the ram accelerator and the outside the tube, and speed up items in the atmosphere to (vacuum) that then mate or connect with other flying systems.

Additionally or alternatively, various embodiments contemplate that a connection magnetically could create a great connection for precise material science applications.

Additionally or alternatively, various embodiments contemplate use of distributed cold gas injection for low G start. Additionally or alternatively, the system could use a Baffle Tube, railed tube or smooth bore projectile and ram acceleration system.

Additionally or alternatively, various embodiments contemplate that a launch from a high altitude off a cliff may guarantee a safe recovery with any velocity (including zero velocity) from ram accelerator. This embodiment may provide a simple Safe system allowing the vehicle and payload (astronaut) to pull a drogue or parachute and safely land given any positive energy state at the exit of the tube. For example, even with 0-velocity there is sufficient potential energy (height) and clearance at the top of the mountain or cliff to allow the capsule parachute to pull.

Additionally or alternatively, various embodiments contemplate a collapsible cup, epplisoidal space vehicle may have a disk shape that expands like a F-11 ejection seat system.

Additionally or alternatively, various embodiments contemplate, a linear aerospike may be used. Additionally or alternatively, various embodiments contemplate an annular aerospike may be embedded within a ram accelerator projectile, for example, using a blunt end. Additionally or alternatively, various embodiments contemplate using rotating detonation wave engine embedded in back of ram accelerator. Additionally or alternatively, various embodiments contemplate using a ring shield flying the ram accelerator then exiting and using an on-board propellant as a RAMAC-Air breathing RAM to Rocket system. For example, this embodiment may be implemented as part of a whole or segmented, self-assembling system.

Additionally or alternatively, various embodiments contemplate using the system to deliver self-assembling satellites.

Additionally or alternatively, various embodiments contemplate beamed power. For example, a ram projectile or a source in space may beam energy to the ATV and run an electric based engine. Additionally or alternatively, various embodiments contemplate deploying a wide area system at altitude that can pump laser or electrical energy from orbit or from another projectile to the ATV. Additionally or alternatively, this approach may delay the degradation of the orbit insertion. For example, this lets the system fight gravity while the ATV is speeding up with a lower impulse engine.

Additionally or alternatively, various embodiments contemplate deploying a balloon in one of these payloads, an Internet-connected app-store for space, and/or storing fuel in the nose for use or delivery.

Figure 6:
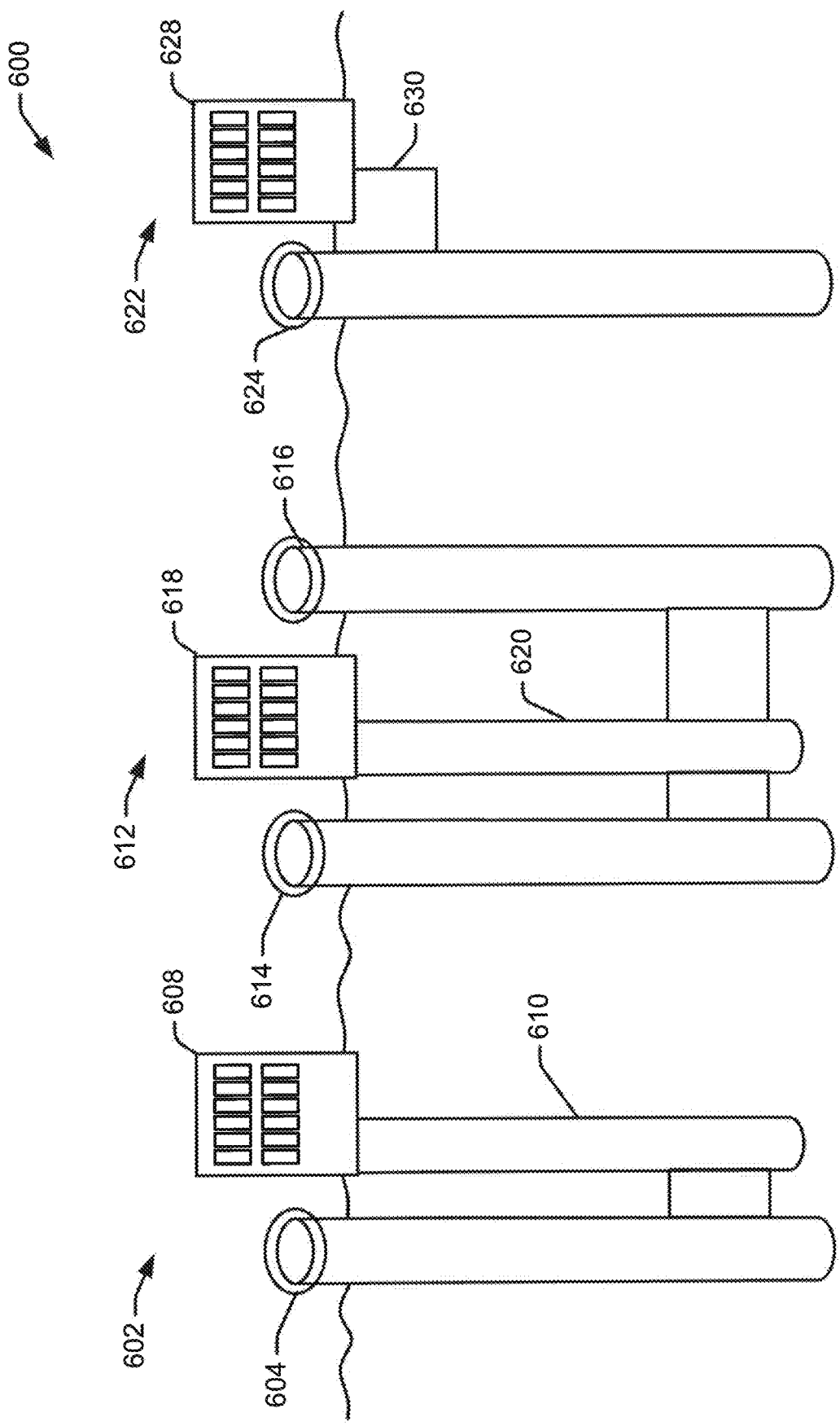
FIG. 6 shows an illustrative launch system.

FIG. 6 shows multiple embodiments of launch system configurations. For example, FIG. 6 shows a launch system environment 600 where a first launch system 602 comprising a ram accelerator launch system 604 is coupled to a distribution system 608. Here, the distribution system 608 is coupled to the ram accelerator launch system 604 through a loading tube 610. Here, a projectile may travel from the distribution system 608, through the loading tube 610 and be loaded into the ram accelerator launch system 604 at or near the bottom of the launch tube, for example, at a start gun.

Various embodiments contemplate this configuration to be a u-tube loader, a nested breech, or a breech loading system.

FIG. 6 also shows a second launch system 612 comprising ram accelerator launch systems 614 and 616 coupled to a distribution system 618. Here, the distribution system 618 is coupled to the ram accelerator launch systems 614 and 616 through a loading tube 620. Here, a projectile may travel from the distribution system 618, through the loading tube 620 and be loaded into either of the ram accelerator launch systems 614 or 616. Here, the loader may insert the projectile at or near the bottom of the launch tube, at a point between the top and the bottom of the launch tube, or near the top.

FIG. 6 also shows third launch system 622 comprising a ram accelerator launch system 624 coupled to a distribution system 628. Here, the distribution system 628 is coupled to the ram accelerator launch system 624 through a loading system 630. Here, a projectile may travel from the distribution system 628, through the loading system 630 and be loaded into the ram accelerator launch system 624 at or near the top of the launch tube. Various embodiments contemplate this configuration to be a muzzle loading system.

Figure 7:
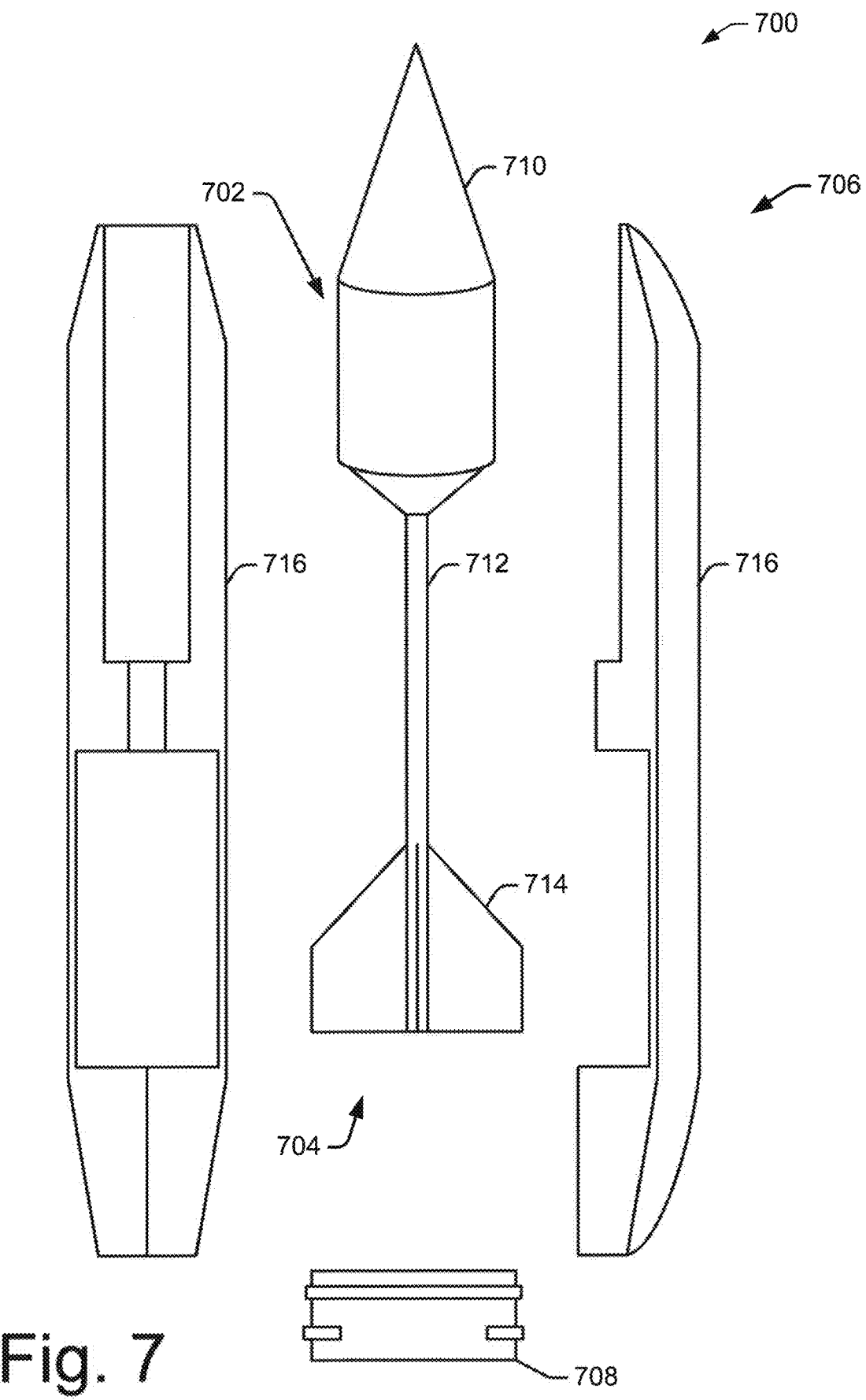
FIG. 7 shows an illustrative projectile.

FIG. 7 shows an illustrative embodiment of projectile assembly 700. For example, FIG. 7 shows a payload module 702, an aero stabilizer structure 704, an aeroshell 706, and an obturator 708. Various embodiments contemplate that the payload module may be coupled to a nosecone 710. Additionally or alternatively, the aero stabilizer structure 704 may comprise a telescoping or extending structure 712 to support and deploy one or more aero stabilizing structures 714, for example fins, pulse controlled propulsion system (cold gas, chemical propulsion, etc). Additionally or alternatively, various embodiments contemplate that the aeroshell 706 may comprise one or more pieces 716 configured to house and protect at least a portion of the payload module and aero stabilizer structure. Various embodiments contemplate that the aeroshell 706 may detach during flight to release the ATV.

FIGS. 8A-B show illustrative launch tube configurations. For example, FIG. 8A shows an illustrative cutaway of a baffle tube with a projectile within the baffle tube's bore. FIG. 8B shows an illustrative example of different projectiles moving through an illustrative baffle tube cutaways where illustrative shock waves are shown on each illustrative projectile.

Figure 9:
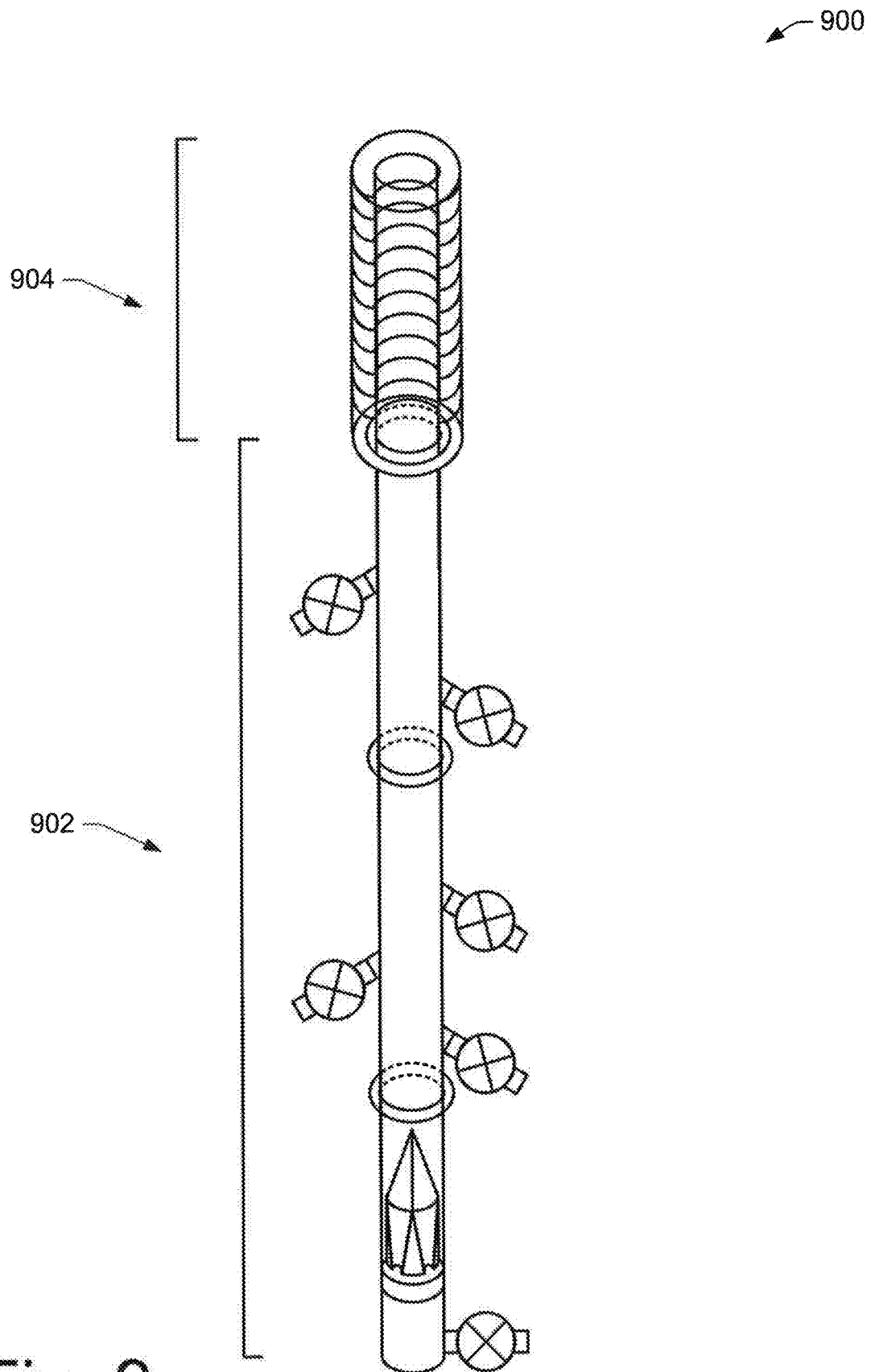

FIG. 9 shows an illustrative launch system 900. Here, the launch system 900 comprises a cold gas start system 902 coupled to a baffle ram accelerator 904. Here, the cold gas start system 902 may have an injection gas reservoir (not pictured) coupled to distributed high speed valves. Here, FIG. 9 shows the high speed valves angled with respect to the tube allowing for improved injection efficiency and momentum transfer during injection.

Figure 10:
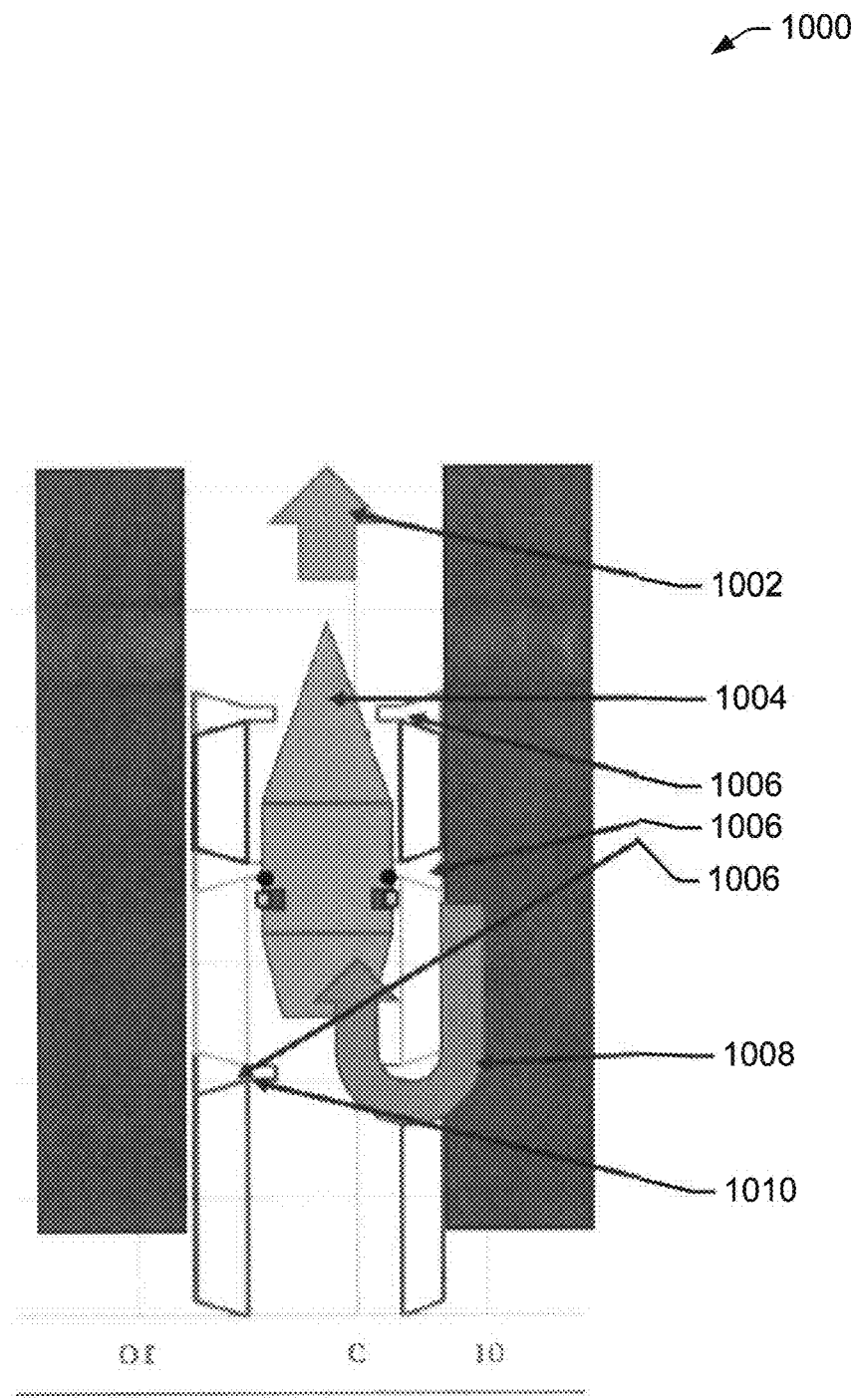

FIG. 10 shows an illustrative distributed injection system 1000. For example, FIG. 10 shows a direction 1002 of a movement of a projectile 1004. Here, highspeed valves or segmented pierce diagrams 1006 may be used to control the gas pressure. Arrow 1008 shows the illustrative direction of the movement of gas from a reservoir through a nozzle or orifice at the injection point. Additionally, FIG. 10 shows supersonic or subsonic nozzles 1010. The configuration of nozzles may be selected based on the relative speed of the projectile 1004 as it passes each nozzle.

Figure 11:
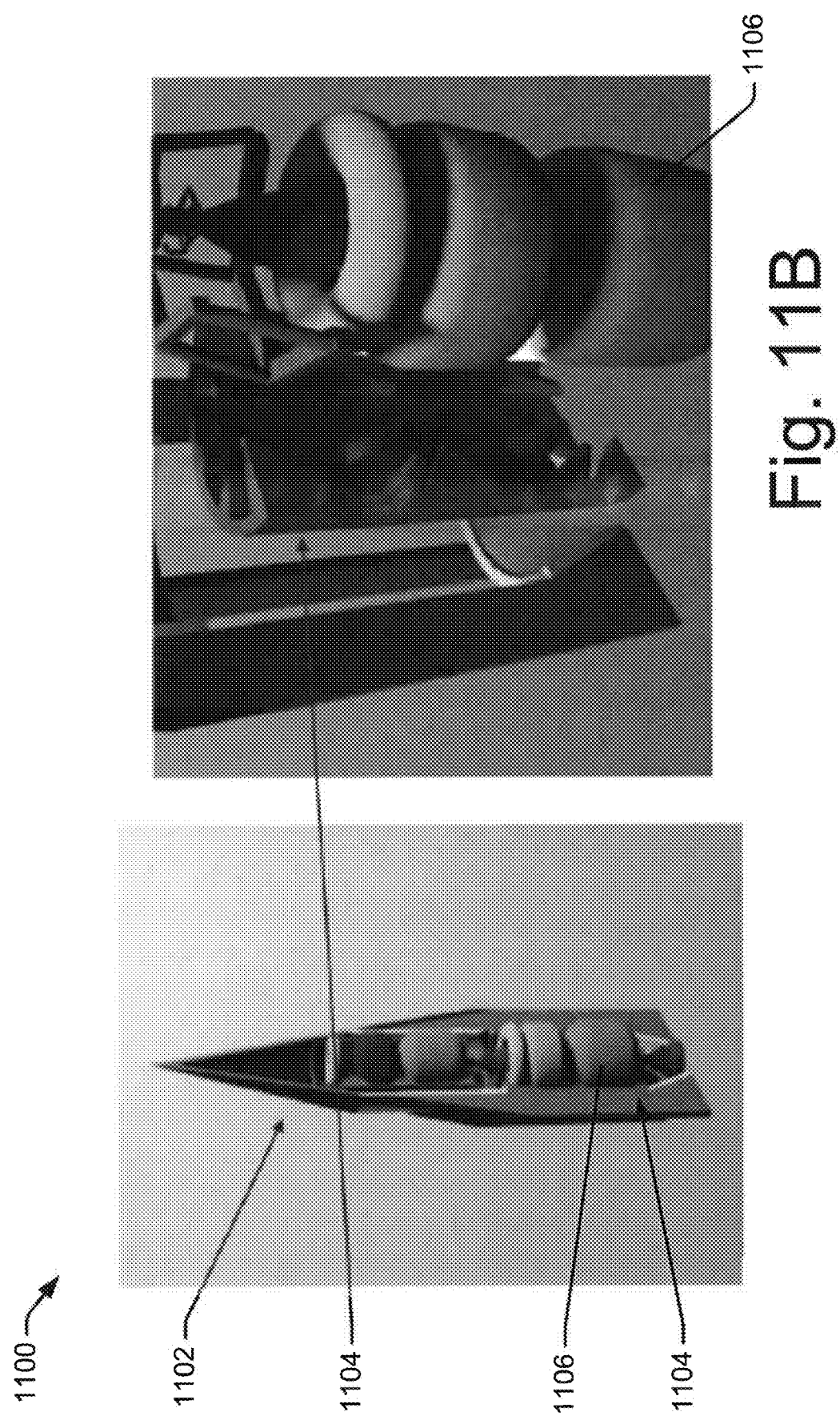
FIG. 11 shows an illustrative projectile support system.

FIGS. 11A-B show an illustrative ATV 1100. For example, FIG. 11A shows an illustrative ATV 1100 with a rocket vehicle encapsulate 1102. Here, for example, the rocket vehicle encapsulate 1102 may comprise 1, 2, 3, or more stages or may be part of a first, second, third, or beyond stages. FIG. 11A also shows an egg-crate support system 1104 configured to support internal structures 1106 of the ATV.

Figure 12:
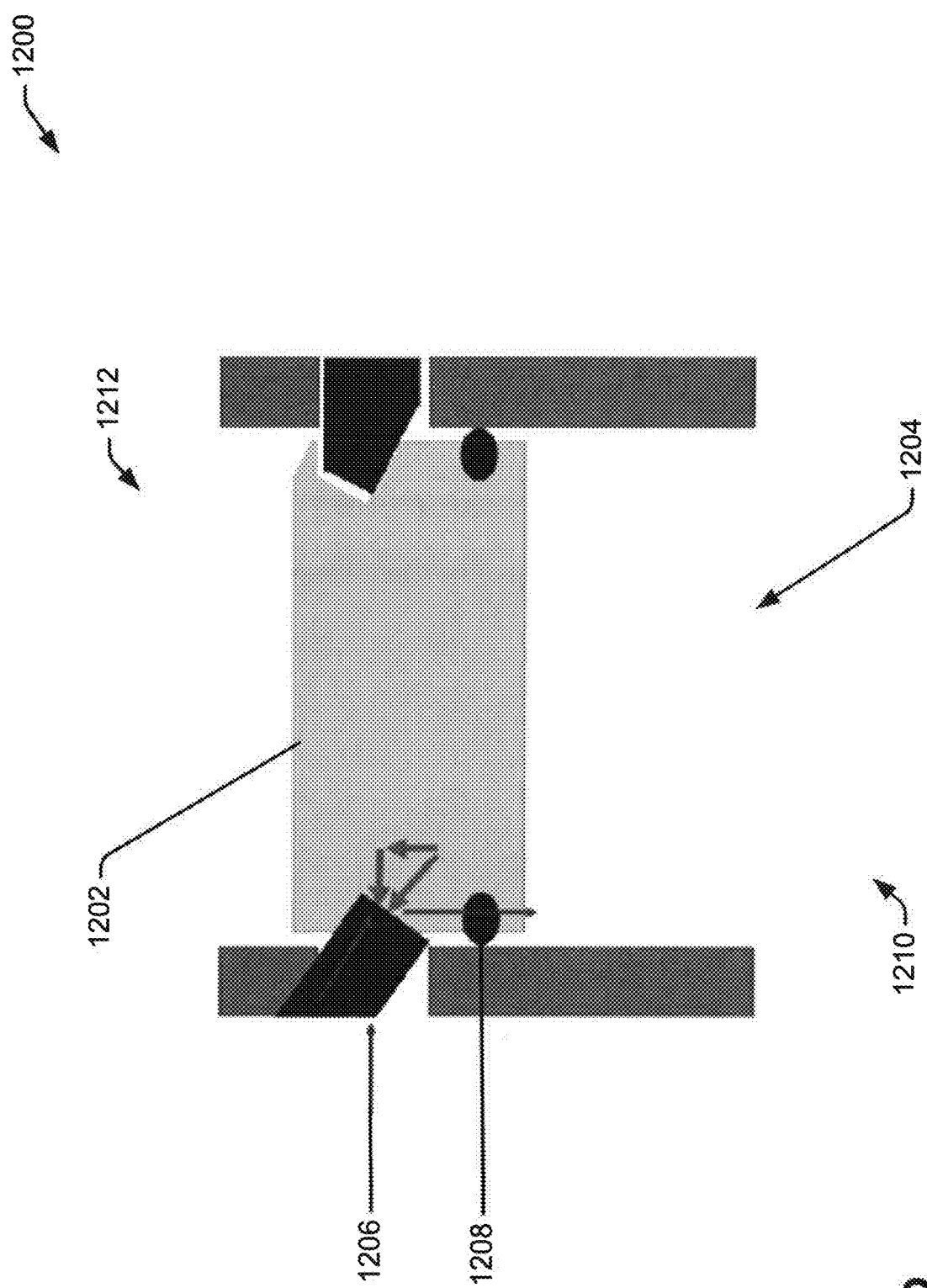
FIG. 12 shows an illustrative launch locking mechanism.

FIG. 12 shows an illustrative locking system 1200 for a moveable diaphragm. For example, FIG. 12 shows a moveable diaphragm 1202 set in a tube bore 1204. Here, the moveable diaphragm 1202 is locked into place by a retractable member 1206, for example, a hydraulic piston. Additionally or alternatively, various embodiments contemplate using differential pressures at either side of the moveable diaphragm 1202 to move it into place in the tube bore 1204. Additionally or alternatively, a sealing mechanism, for example, O-ring 1208 may be disposed in the moveable diaphragm 1202 and may selectively seal against the inside of the tube bore 1204. Various embodiments contemplate applying a higher pressure to one side of the moveable diaphragm 1202, for example, at 1210 when compared to the pressure at 1212. In this configuration, the higher pressure at 1210 may cause a portion of the moveable diaphragm to displace and cause the O-ring to press against the bore of the tube 1204. When a sufficient pressure is applied, the O-ring may hold the moveable diaphragm 1202 in place while retractable member 1206 may be retracted from the tube bore 1204.

Illustrative Processes and Techniques

FIG. 13 shows an illustrative process and technique 1300 for launching a projectile. For example, at 1302 a projectile is loaded into a distributed injection cold gas start gun of a ram accelerator.

At 1304, the system selectively pressurizes the tube of the cold gas start gun to accelerate the projectile.

At 1306, the system releases a movable diaphragm towards the projectile in the cold gas start gun. This has the effect of increasing relative velocity that the projectile experiences with respect to the gas and allows the projectile to reach effective ramming speed sooner than would otherwise be achievable.

At 1308, when the projectile nears the end of the cold gas gun, the system may open a fast-acting valve between the cold gas start gun and a first ram section of the ram accelerator.

At 1310, the system passes the projectile through the fast-acting valve maintaining a velocity of the projectile. The fast-acting valve allows the projectile to pass through the valve with minimal loss of effective velocity and allows any shock front associated with the projectile to pass through the valve uninterrupted.

At 1312, the system accelerates the projectile through the ram accelerator using ram combustion. The ram accelerator may have multiple stages using different gases tailored to the expected and desired speed of the projectile through each stage of the ram accelerator.

Figure 14:
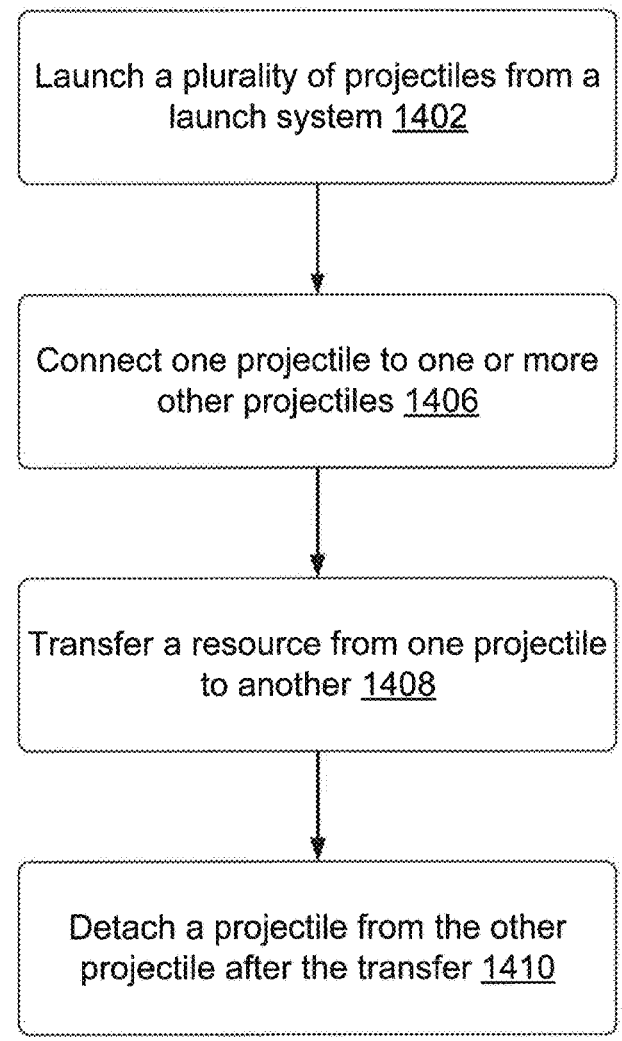

FIG. 14 shows an illustrative process and technique 1400 for launching and connecting multiple projectiles. For example, at 1402, the system may launch a plurality of projectiles from a launch system. For example, multiple launch systems or technologies may be used to launch each projectile.

At 1404, the system may connect one projectile to one or more other projectiles. This may be accomplished by launching the projectiles on intercepting courses or through maneuvers of one or more projectiles after launch. Various techniques and mechanisms may be used, for example, thrusters, tethers, telescoping members, among others. When sufficiently close to each other, the projectiles may more securely join together, for example, through the use of magnetic or physical locking mechanisms.

At 1406, the connected projectiles, may transfer a resource from one projectile to another. For example, the transfer may comprise energy in the form of electrical power, propellants, information, cargo, kinetic energy transfer, among others, or combinations thereof.

At 1408, the system may detach a projectile from the other projectile or projectiles after the transfer. For example, if a propellant has been transfer, the supplying projectile may be detached after the transfer. Additionally or alternatively, if a kinetic energy is transferred, for example, through a tether, the pulling projectile (and in some embodiments the tether) may be detached after the pulling projectile completes the desired kinetic transfer.

Conclusion

Although embodiments have been described in language specific to structural features and/or methodological acts, it is to be understood that the disclosure is not necessarily limited to the specific features or acts described. Rather, the specific features and acts are disclosed herein as illustrative forms of implementing the embodiments. Any portion of one embodiment may be used in combination with any portion of a second embodiment.

What is claimed is:

1. A multiple projectile launch system comprising:
    a plurality of launch mechanisms configured to accelerate a respective projectile each;
    a first control system configured to coordinate the acceleration of the respective projectiles in the respective plurality of launch mechanisms; and
    a second control system, disposed in one or more of the respective projectiles, configured to assemble one or more of the respective projectiles in flight after launch.

2. The multiple projectile launch system of claim 1, wherein the plurality of launch mechanisms comprises one or more of a ram accelerator, a kinetic energy launch system, a hybrid launch system, a chemical rocket system, an electric propulsion launch system, or combinations thereof.

3. The multiple projectile launch system of claim 1, wherein the first control system configured to stage a first projectile from a first system and a second projectile in a second system such that the first projectile in the first system experiences a lower g-load than the second projectile in the second system.

4. The multiple projectile launch system of claim 1, wherein
    one or more of the respective projectiles comprises one or more of a tether system, a locking mechanism, a propellant transfer system, or combinations thereof; and
    the second control system is configured to activate the one or more of the tether system, the locking mechanism, the propellant transfer system, or combinations thereof to act on at least one other of the respective projectiles.

5. The multiple projectile launch system of claim 1, further comprising an onsite distribution system configured to, upon request of a user, select and load into two or more of the plurality of launch mechanisms two or more projectiles, and launch the selected and loaded two or more projectiles.

* * * * *